Figure 1A:
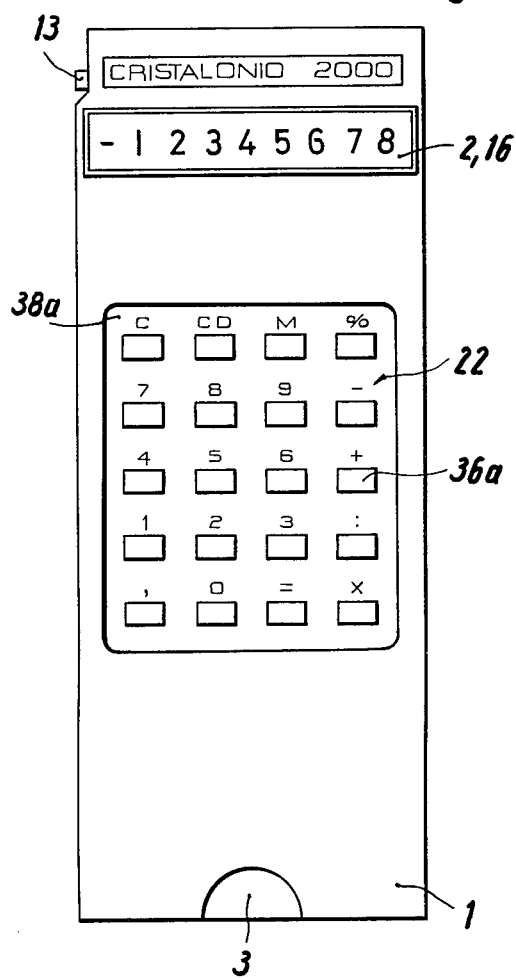

United States Patent [19]

Zielinski

[11] 4,002,892
[45] Jan. 11, 1977

[54] PORTABLE CALCULATOR

[76] Inventor: Adolf H. Zielinski, Haidgraben 101, 8012 Ottobrunn, Germany

[22] Filed: Sept. 16, 1974

[21] Appl. No.: 506,196

[30] Foreign Application Priority Data

Sept. 15, 1973 Germany .................. 7333551[U]
Feb. 2, 1974 Germany .................. 2405062

[52] U.S. Cl. ................... 235/156; 200/292; 307/150; 307/154; 317/101 C; 339/17 LC; 339/17 M
[51] Int. Cl.² ........................ G06F 15/02
[58] Field of Search ....... 200/292, 5 A, 5 R, 159 B; 235/145 R, 156; 307/150, 154; 317/101 A, 101 B, 101 C, 99, 101 D, 101 R, 101 DH; 325/492; 339/17 LC, 17 M

[56] References Cited

UNITED STATES PATENTS

| 3,059,185 | 10/1962 | Krugman | 325/492 X |
|---|---|---|---|
| 3,070,748 | 12/1962 | Worobey et al. | 325/492 |
| 3,445,848 | 5/1969 | Goldstein | 325/492 X |
| 3,591,749 | 7/1971 | Comstock | 200/292 X |
| 3,667,045 | 5/1972 | Combs | 317/101 R |
| 3,676,656 | 7/1972 | Schmidt | 235/156 |
| 3,699,294 | 10/1972 | Sudduth | 200/292 X |
| 3,745,287 | 7/1973 | Walker | 200/292 X |
| 3,761,781 | 9/1973 | Dean | 317/120 |
| 3,769,552 | 10/1973 | Cook et al. | 317/101 DH |
| 3,813,533 | 5/1974 | Cone et al. | 235/156 |
| 3,819,921 | 6/1974 | Kilby et al. | 235/156 |
| 3,843,851 | 10/1974 | Harada et al. | 200/5 E |

OTHER PUBLICATIONS

Fazzio, D. P., Circular Sequencing Contact in IBM Tech. Disc. Bull., 13(1): p. 219, June 1970.
Goodman, H. A. et al., Integrated Packaging for Transparent Elastic Diaphram Switch in IBM Tech. Disc. Bull. 15(2): pp. 544-545, July 1972.
Sedaris, L. H. et al., Elastic Diaphram Switch in IBM Tech. Disc. Bull. 14(3); p. 767, Aug. 1971.

Primary Examiner—R. Stephen Dildine, Jr.
Attorney, Agent, or Firm—Olson, Trexler, Wolters, Bushnell & Fosse, Ltd.

[57] ABSTRACT

A portable electronic calculator is provided with a housing carrying a first printed circuit board having the operating parts mounted thereon, i.e., keyboard, electronic arithmetic unit, and multi-digit display unit. The housing is of rectangular outline and of shallow height, and is provided at one end with a receptacle communicating with the first printed circuit board and opening at the end of the housing. An electrical supply unit is mounted on a second printed circuit board which slides into said receptacle, said two printed circuit boards having plug-and-socket connection means therebetween for automatically making and breaking connections when said second printed circuit board and electrical supply unit are inserted into or removed from said receptacle.

3 Claims, 13 Drawing Figures

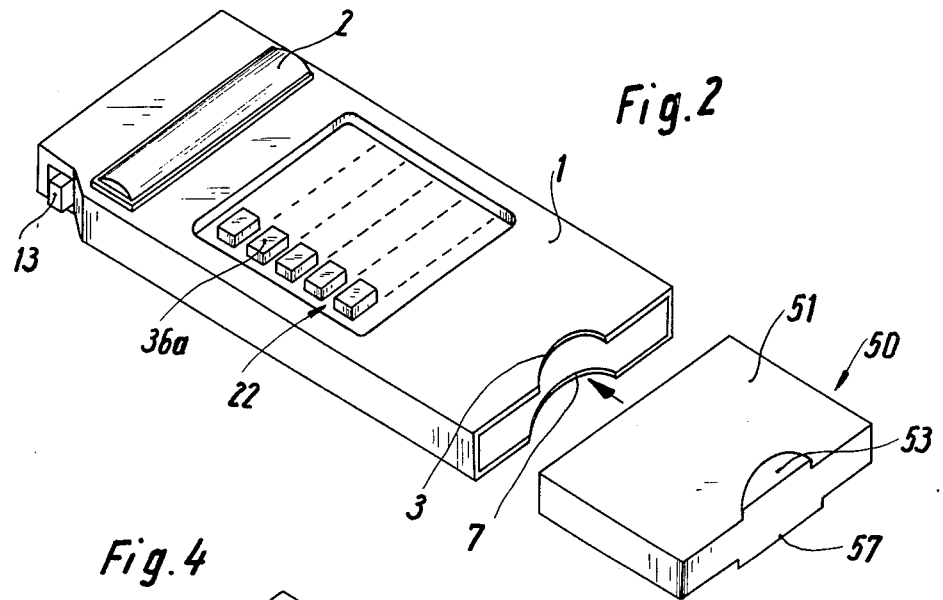
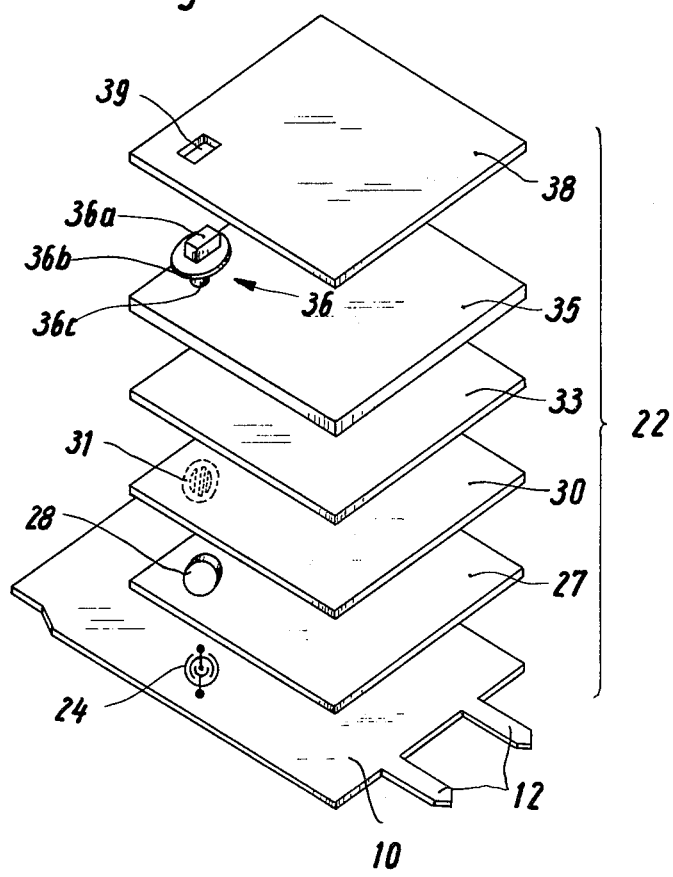
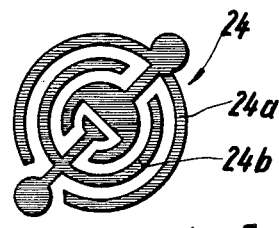
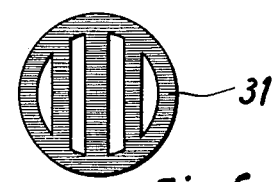

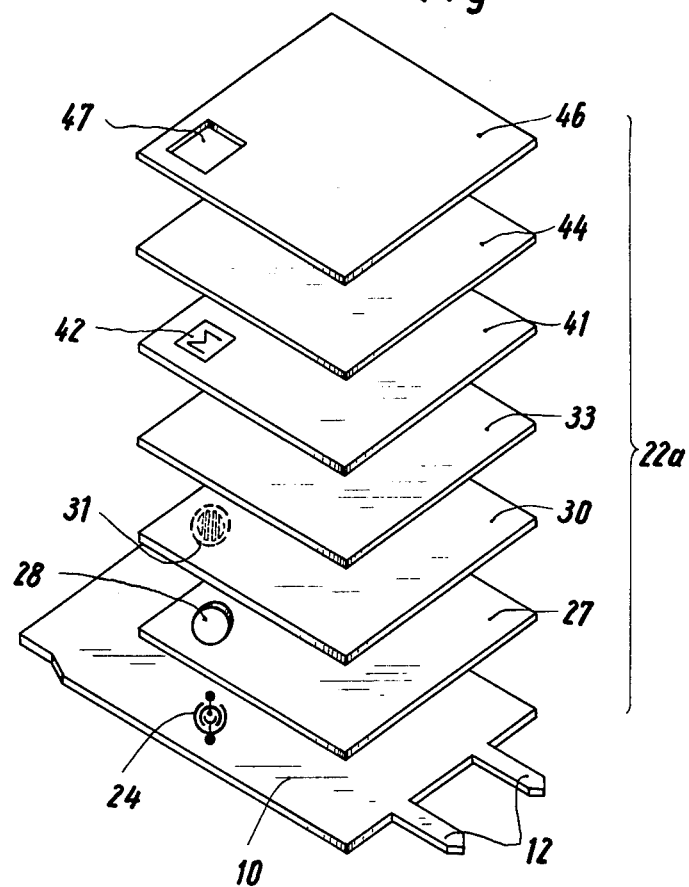

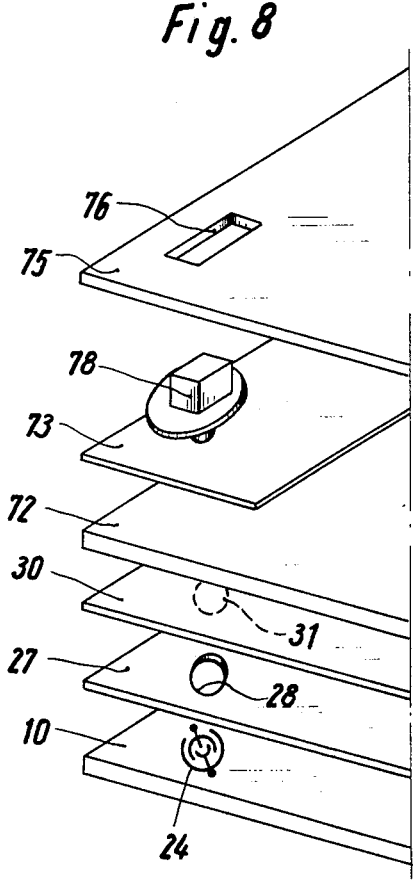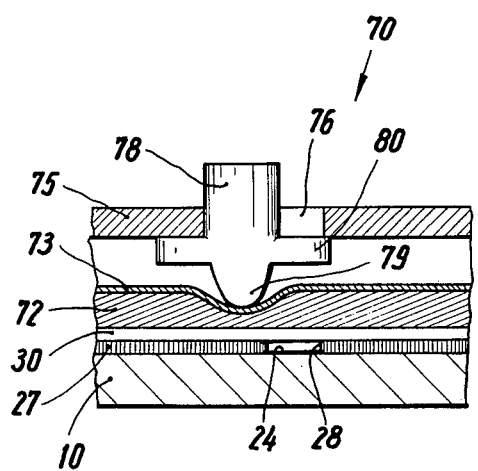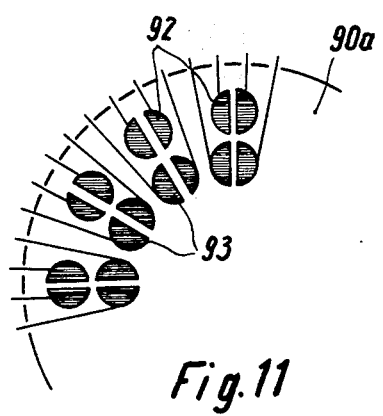

PORTABLE CALCULATOR

This invention relates to a portable electronic calculator of the type having a keyboard, an electronic arithmetic unit, a multi-digit display unit, a supply circuit, to which batteries for example may be connected, and circuitry by which those elements may be interconnected in one common housing.

The replacement of mechanical arithemtic units in small calculators by electronic components has largely contributed to the wider use of such apparatus. The adoption of printed circuit boards and semi-conductors or integrated circuits in portable calculators has already enabled the housing to be built to far smaller dimensions and the cost of production to be reduced. Known miniature electronic calculators, however, still entail high production costs, because they are merely reduced in size but otherwise built up in the conventional manner; they are also expensive to operate, as their source of energy consists of non-rechargeable batteries.

An object of the invention is to provide an extremely small but nevertheless robust and relatively inexpensive calculator.

A portable electronic calculator comprises, according to this invention, a keyboard; an electronic arithmetic unit; a multi-digit display unit; a supply circuit; a housing for the before-mentioned elements; a single supporting printed circuit board formed in two sections, one of which carries all said elements except the supply circuit and the other of which carries the supply circuit, the circuit board having printed thereon the interconnecting circuitry for said elements and all the electrical contacts of the keyboard; and a connection adapted to interconnect the two sections mechanically and electrically.

The invention thus provides new construction adapted to lead to thorough miniaturisation. One single printed circuit board is sufficient to hold all elements of the calculator mechanically, and to interconnect them electrically. The time and labour involved in the mounting of the elements may be extremely slight, and the resulting calculator may have a small over-all height. The supporting printed board is the backbone of the calculator, which is thus rendered exceptionally stable. At the same time, the division of the printed circuit board into two sections enables the apparatus to be separated, by simple means, into the calculator proper and the supply unit, which for re-charging purposes can be introduced without difficulty into a power pack constructed having connections similar to those of the calculator.

The two contacts of each key of the keyboard may advantageously consist of two printed concentric conductor elements which have diametrically opposite connections. These printed key contacts can with advantage be closed by a bridge contact which can take the form of a metal coating on a plastics foil, which is separated by an insulating foil perforated on the contact zone, from the supporting circuit board.

The invention permits various possibilities for the construction of the keyboard. For example, in a plate bearing the symbols, cut-out parts can be provided in each case above the bridge contacts, giving access to the finger, so that the contacts situated underneath them can be closed.

It is also possible, however, for key members movable with the bridge contacts to be provided above the polyester foil and to protrude through a perforated keyboard plate, being elastically biased away from the key contacts, e.g. by means of a foam plastic coating. Each of these key members may have an internal operating part which, possibly via an intermediate protective layer, deforms the polyester foil, with the bridge contact printed on to it, when the key member is pressed, and thus closes the contacts.

Figure 1B:
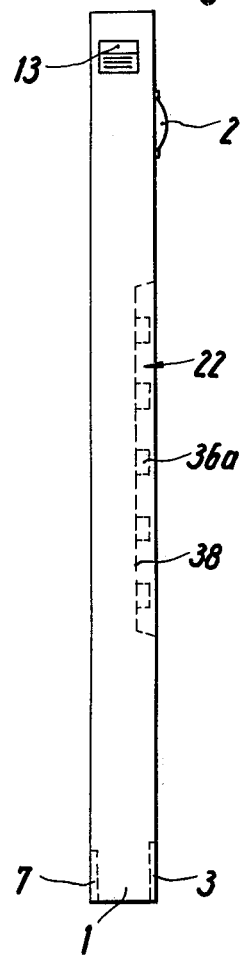
Figure 1C:
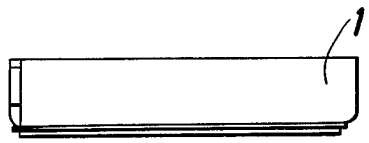
Figure 3:
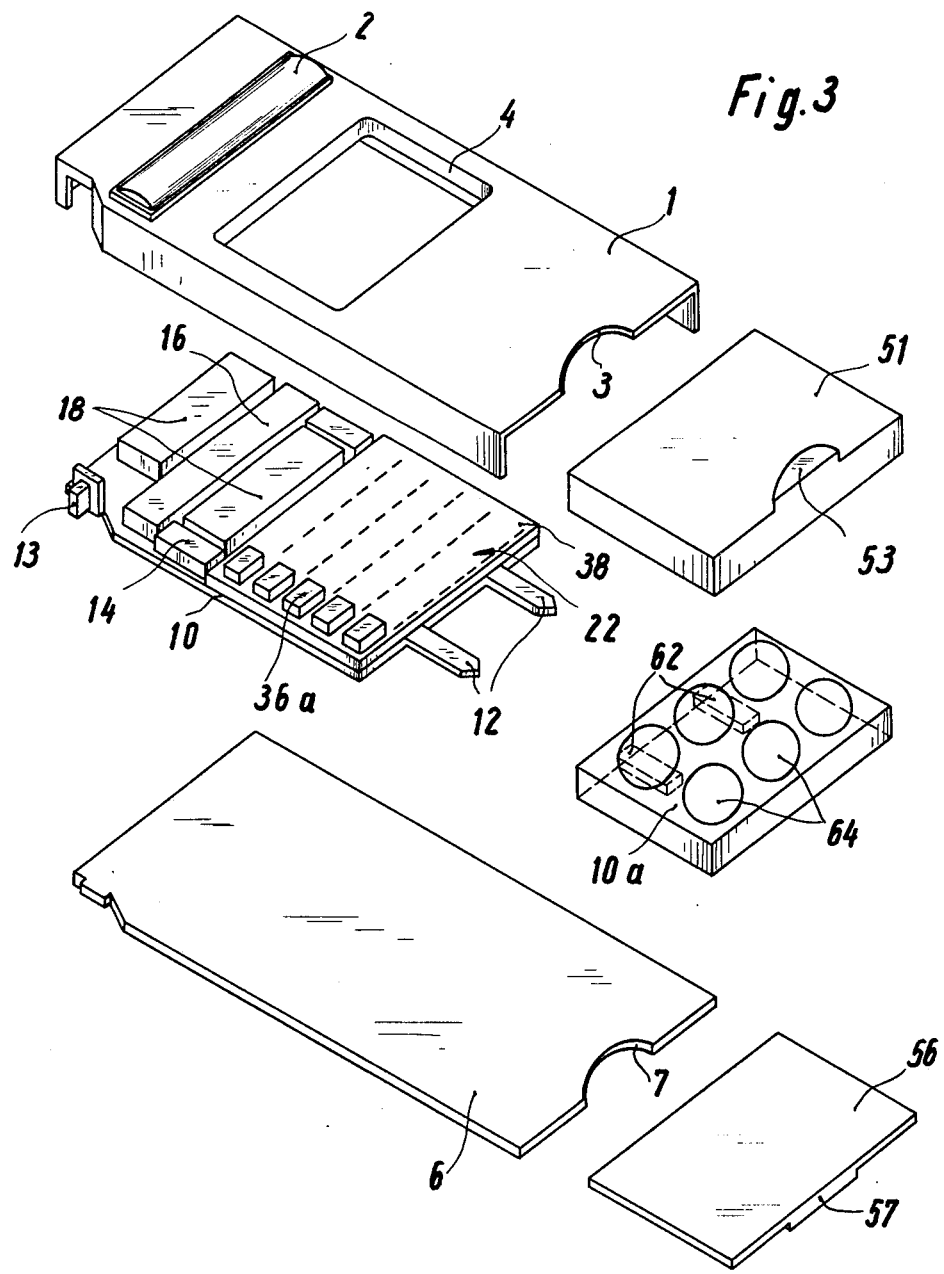

The invention will be more readily understood by way of example from the following description of a portable electronic calculator in accordance therewith, reference being made to the accompanying drawings, in which:

FIGS. 1a, 1b and 1c are respectively a plan view, a side view and as an end elevation of the calculator, FIG. 2 is a perspective view of the calculator of FIG. 1, with the battery insert withdrawn, FIG. 3 is an exploded view of the calculator of FIG. 2, FIG. 4 is an exploded view of the keyboard of the calculator, FIG. 5 shows on enlarged scale a pair of key contacts, FIG. 6 shows a contact associated with the pair of contacts of FIG. 5, and designed on the printed circuit principle, FIG. 7 shows an alternative form of keyboard, in an exploded view similar to FIG. 4, FIG. 8 is an exploded view of a slide switch in the calculator, FIG. 9 is a section through the assembled slide switch of FIG. 8, FIG. 10 is a similar section through a slide switch having a number of switching positions, and FIG. 11 is a plan view of the contacts of a similar switch with an arcuate slide path and two separate sets of switch contacts in each switch position.

FIGS. 1a to 1c show the calculator in readiness for operation and on an approximate scale of 1:1, while FIG. 2 shows the battery insert 50 withdrawn. The internal construction of the calculator can best be explained by reference to FIG. 3. The outer covering of the computer consists of a plastics housing 1 and a housing base 6; a battery housing 51 for the battery insert 50 having a corresponding housing base 56 is insertable in the housing 1. An optically magnifying digit cover 2 of vitreous transparent material is secured to the housing 1, which has a finger slot 3, an opening 4 to receive a keyboard, and a switch opening, not shown in detail. An upwardly extending grip 53 is formed on the battery housing 51 and is received in the finger slot 3 when the housing 51 is inserted in housing 1. Similarly, the housing base 6 has a lower finger slot 7, which, however, has a radius of curvature different from that of slot 3 and is intended to accommodate lower grip 57 on the housing base 56. The two differently constructed finger slots 3 and 7 ensure that the battery insert 50 (see FIG. 2) can only be inserted into the housing in the correct relative position.

All the essential computing elements of the calculator are attached to one common plastics supporting circuit board 10, which on both sides carries the entire printed circuit of the calculator, to which the individual computing elements are soldered. As shown in FIG. 3, the supporting board 10 has two parallel, outwardly projecting, integral pins 12, which have conductor paths printed on them and which are received in corresponding sockets 62 in the battery insert 50, as will be described in due course. In the present example, the integral pins 12 are situated in the same plane as the board 10, but it is also possible, as a further safeguard against incorrect polarisation, for these pins to be offset in relation to each other and/or provided with depressions or raised attachments.

A switch 13 is mounted above an opening in board 10 and passes through a cut-out part in the housing 1. Furthermore, the upper face of board 10 carries a voltage converter 14, a monolithic digit disply unit 16 and an electronic drive system 18. The voltage converter 14, by which the battery voltage from the battery insert 50 is converted into the voltage required for the operation of the calculator and the electronic drive system 18, together containing all the logical elements of the valculator, are formed as integrated circuits and are soldered as prefabricated chips to the printed circuit of the supporting board 10.

The nine-place digit display unit 16 provided in the present example is constructed as a monolithic module having a gallium-phosphide base. The similar digit segments of all nine positions are connected with one another throughout, and the individual positions are actuated via a separate counter-electrode on the time sharing multiplex principle.

Instead of being of the luminous diode digit type, the display unit 16 may be of the type having a liquid crystal base.

The chips of the calculator electronic system are followed as shown in FIG. 3 by a keyboard 22 which has a total of twenty keys 36 of which the parallelopipedal upper parts 36a pass through openings 39 of a keyboard 38 which is printed with symbols in the conventional manner and which may, for example, take the form of perforated sheet metal plate. The construction of the keyboard 22 can best be seen from FIGS. 4 to 6.

Perpendicularly underneath each individual key 36 there is a pair of key contacts 24 mounted on the supporting board 10 bearing the printed circuit. The contacts 24 are shown in FIG. 5 on a considerably enlarged scale and consist of two interfitted groups 24a and 24b of contact elements. These groups of contact elements form parts of the printed circuit on the supporting board 10 and are electrically separated from one another.

That part of the supporting board 10 which carries the pair of key contact elements 24 is covered with a thin insulating foil 27 which, in the zone of each individual pair 24 of key contact elements, is provided with a perforation 28. The insulating foil 27 is covered with a polyester foil 30 of the same size, having, on its lower side, in the zone of each perforation 28, a printed bridge contact 31 constructed as a copper lining and designed as shown in FIG. 6. When the keyboard 22 is in the non-operated condition, therefore, each bridge contact 31 is spaced above the pair of key contact elements 24 associated with it, the spacing corresponding to the thickness of the insulating foil 27.

The polyester foil 30 is covered with a rubber foil 33 of the same size and 1 mm in thickness, serving as a protective layer for the polyester foil 30. The rubber foil 33, in its turn, supports a foam plastic layer 35 of about 2 mm in thickness. Each key 36 consists of the before-mentioned upper part 36a, a plate-shaped central part 36b and a circular pressure part 36c which is received in a hole in layer 35 and which has a height less than the thickness of the foam plastic layer 35. In the non-operated state the plate-shaped central part 36b of the scanning element 36 rests on the surface of the foam plastic layer 35.

If, in the course of the operation of the calculator, a certain key 36 on the keyboard 22 is pressed, the pressure part 36c of that key deforms the rubber foil 33 and the polyester foil 30 underneath it to such an extent that the corresponding bridge contact 31 touches the relevant pair of contact elements 34 and bridges them. A locally limited current now flows between the specified elements, but is isolated from adjacent pairs of key contact elements. Faults are thus largely eliminated.

In place of the keyboard 22 already described, it is possible to use a keyboard 22a as shown on exploded view in FIG. 7. In this arrangement, the parts are similar to those of FIG. 4 up to the rubber foil 33.

The main difference between the two keyboards lies in the fact that in the FIG. 7 arrangement the key 36 is replaced by a depression in the form of a cut-out part 47 in a keyboard 46 which is constructed as a perforated plate and which forms the top layer of the keyboard 22a. The keyboard 46 has beneath it first a transparent protective foil 44, and then a keyboard foil 41, with symbols 42 printed on to it.

If, in the course of the operation of the calculator fitted with this keyboard 22a, a key is to be pressed, then a finger is inserted into the corresponding cut-out part 47 of the keyboard, pressure being exerted on the transparent protective foil 44, through which is visible the printed symbol 42 situated beneath it. The pressure exerted by the tip of the finger transmits itself via the rubber foil 33 to the polyester foil 30, so that the bridge contact 31 can bridge the two groups of contact elements 24a and 24b of the pair of key contacts 24 situated underneath.

As shown in FIG. 3, the battery insert 50 has a number of disc cells 64, e.g. of the nickel-cadmium type. In the battery supporting plate 10a, which is also constructed as a printed circuit, there are two contact sockets 62 which are provided with corresponding contact elements and which, when the battery insert 50 has been introduced, communicate with the conductor paths of the integral pins 12 of the supporting plate 10, thus providing the calculator with current, as soon as switch 13 is actuated.

The calculator described can be provided, in a suitable position, with external contacts which are not shown in the drawing and by which the electronic drive system 18 can be controlled externally. This enables the calculator to be connected, e.g. by means of a suitable plug, with an angle coder of a machine tool, so that the rotations of the spindle of a machine tool slide can be integrated and the result shown on the digital display device 16. This enables the calculator to be employed, as desired, as an operational computer on machine tools, testing apparatus and similar equipment.

The calculator described above may be provided not only with the key contacts and the connection switch 13 but also with one or more additional switches. FIGS. 8 and 9 show a switch 70 which is constructed as a slide switch and of which the structure is largely similar to the key contacts of the keyboard 22 and utilises parts of that key board; parts similar to parts of switch 22 are given the same reference numerals.

The switch 70 is also of sandwich construction and makes use of the insulating foil 27 which is provided with perforations 28 and is situated above the printed current board carrying the pair of key contacts 24. The polyester foil 30 above the foil 27 carries the bridge contact 31 in the form of a copper coating, which, when the switch 70 is closed, bridges the groups of contact paths of the key contacts 24.

The polyester foil 30 is covered with an elastic, relatively soft and thick rubber sheet 72. As shown in FIG. 8, the rubber sheet 72 is provided, in the area above the pair of contacts 24, with a thin polyester strip 73 which is self-adhesive on its lower side and the purpose of which is to impart to the rubber sheet, in the zone of the switch, and on its upper side, a low coefficient of friction, without appreciably altering its elasticity.

Spaced above the rubber sheet 72 and the polyester strip 73 is a cover plate 75, which may be identical with the keyboard 38 of the calculator described previously. Through a slide slot 76 in the cover plate 75 passes a slide element 78 which is formed beneath the cover plate 75, with a plate-shaped central part 80 and with a downwardly directed convex pressure part 79; instead of the integral form shown, the pressure part 79 may be constituted by a ball. The over-all height of the pressure part 79 and central part 80 is seen from FIG. 9 to be greater than the spacing between the polyester strip 73 and the lower side of the cover plate 75 when the rubber sheet 72 is undeformed. The pressure part 79 thus continuously presses into that section of the elastic rubber sheet 72 which is situated beneath it, as may be seen from FIG. 9. If the slide element 78 is pushed manually from its inoperative position, shown in FIG. 9, towards the right into its operative position, then the convex pressure part 79 is situated exactly above the perforation 28 in the insulating foil 27, so that the polyester foil 30 provided with the bridge contact 31 is pressed into the perforation 28 and the pair of key contacts 24 situated underneath it is bridged. The switch 70 is then closed.

Using this switch principle, it is also possible for a number of contact sets situated one above the other to be actuated with one single slide element 78.

FIG. 10 shows a similar but multi-position switch 70a. The base of this switch 70a is formed by a printed circuit board 90, which may also be identical with the board 10 described previously. The circuit board 90 has, for each individual switch position, at least one pair of contacts 91, which are individually bridged by associated bridge contacts on the polyester foil 30 when the slide element 78 occupies a corresponding switch position immediately above. As before, the foil 30 is separated from the plate 90 by an insulating foil 97 which has a perforation 98 located above each pair of contacts 91. The switch 70a has a cover plate 75a which is similar to the cover plate 75 and which is likewise spaced above the polyester strip 73 and which has a slide slot 76a overlying all the switch positions and having an appropriate length. The function of the switch 70a largely coincides with that of the switch 70 already described.

The slide slot 76a may take either a linear or an arcuate course. In FIG. 11 a printed circuit board 90a is shown for a slide element movable along a part-circular path, that element being operable by a shaft having a rotary knob, on the principle of a roller switch. In this board 90a, two adjacent pairs of contacts 92 and 93 are independently bridged in each switch position. In this case the slide element (not shown) is provided on its lower side with two adjacent convex pressure parts of the same type as the pressure part 79.

In conclusion, it should be noted that owing to the perforations 28 and 98 in insulating foils 27 and 97 respectively, a certain detent effect is obtained in each switch position, as a result of which the slide element 78 retains in a stable manner whatever switch position has been selected for it.

What we claim is:
1. A portable electronic calculator comprising a housing of substantially rectangular outline having a length greater than its width and being of shallow height relative to its width, said housing having an end opening receptacle at one end thereof surrounded by top, bottom and side walls, a first printed circuit board retained in said housing inwardly of said receptacle and having connected thereto a keyboard, an electronic arithmetic unit, and a multi-digit display unit, said housing having appropriate areas for visual access to said display unit and for manual access to said keyboard, a second printed circuit board, and electrical supply unit on said second printed circuit board, said electrical supply unit and said second printed circuit board being movable into and out of said receptacle and positioned thereon by said walls, and plug- and-socket connection means between said first and second printed circuit boards and automatically engaging and disengaging upon insertion and withdrawal of said second printed circuit board and electrical supply unit said second printed circuit board and said electrical supply unit being housed in a rectangular block fitting within said receptacle.

2. A calculator as set forth in claim 1 and further including means providing a notch in a wall of the calculator housing and a projection on said block to key the position of said block in said calcultor housing.

3. A calculator as set forth in claim 1, wherein the first and second printed circuit boards are coplanar when the second printed circuit board is in said receptacle.

* * * * *